United States Patent [19]

Juang

[11] Patent Number: 5,191,606
[45] Date of Patent: Mar. 2, 1993

[54] ELECTRICAL TELEPHONE SPEECH NETWORK

[75] Inventor: Dar-Chang Juang, Portz, Taiwan

[73] Assignee: Industrial Technology Research Institute, Hsinchu, Taiwan

[21] Appl. No.: 520,212

[22] Filed: May 8, 1990

[51] Int. Cl.⁵ .............................................. H04M 1/00
[52] U.S. Cl. .................... 379/391; 379/387; 379/361; 379/395
[58] Field of Search ............... 379/387, 388, 390, 391, 379/361, 362, 395; 381/120; 330/297, 296, 199, 127, 200

[56] References Cited

U.S. PATENT DOCUMENTS

| | | | |
|---|---|---|---|
| 4,406,926 | 9/1983 | Duncan | 379/361 |
| 4,442,322 | 4/1984 | Grantland | 379/361 |
| 4,496,799 | 1/1985 | Kingen et al. | 379/361 |
| 4,507,619 | 3/1985 | Dykstra et al. | 330/297 |
| 4,508,938 | 4/1985 | Bench et al. | 379/361 |
| 4,550,226 | 10/1985 | Teater | 379/395 |
| 4,598,255 | 7/1986 | Hong | 330/297 |
| 4,640,993 | 2/1987 | Whittaker | 379/395 |
| 4,713,629 | 12/1987 | Segal | 330/297 |

FOREIGN PATENT DOCUMENTS 2082412 3/1982 United Kingdom ................ 330/297

Primary Examiner—James L. Dwyer
Assistant Examiner—Jhancy Augustus
Attorney, Agent, or Firm—Darby & Darby

[57] ABSTRACT

An electrical telephone speech network is disclosed in which the transmitting and the receiving amplifiers are serially connected so as to reduce the minimum working current of the whole speech network. As a result, a telephone set in the network can operate properly with a much lower line current, and more extension telephones can be connected parallelly with the speech network. Further, a bias switching circuit is matched with the speech network. Thus, in pulse dialing mode, the line voltage drop of the network loop during "make" status is automatically decreased so that a pulse dialing signal received by the exchange can be more accurate. At the same time, in DTMF dialing mode, the voltage drop of the telephone set is automatically increased, for the purpose of providing a larger AC signal dynamic range to enable a telephone set to deliver a large DTMF signal and operate with a lower line current. Also, owing to direct coupling for feeding DTMF sidetones, the subscriber receives a signal with the least distortion and most stable DTMF sidetone volume.

2 Claims, 4 Drawing Sheets

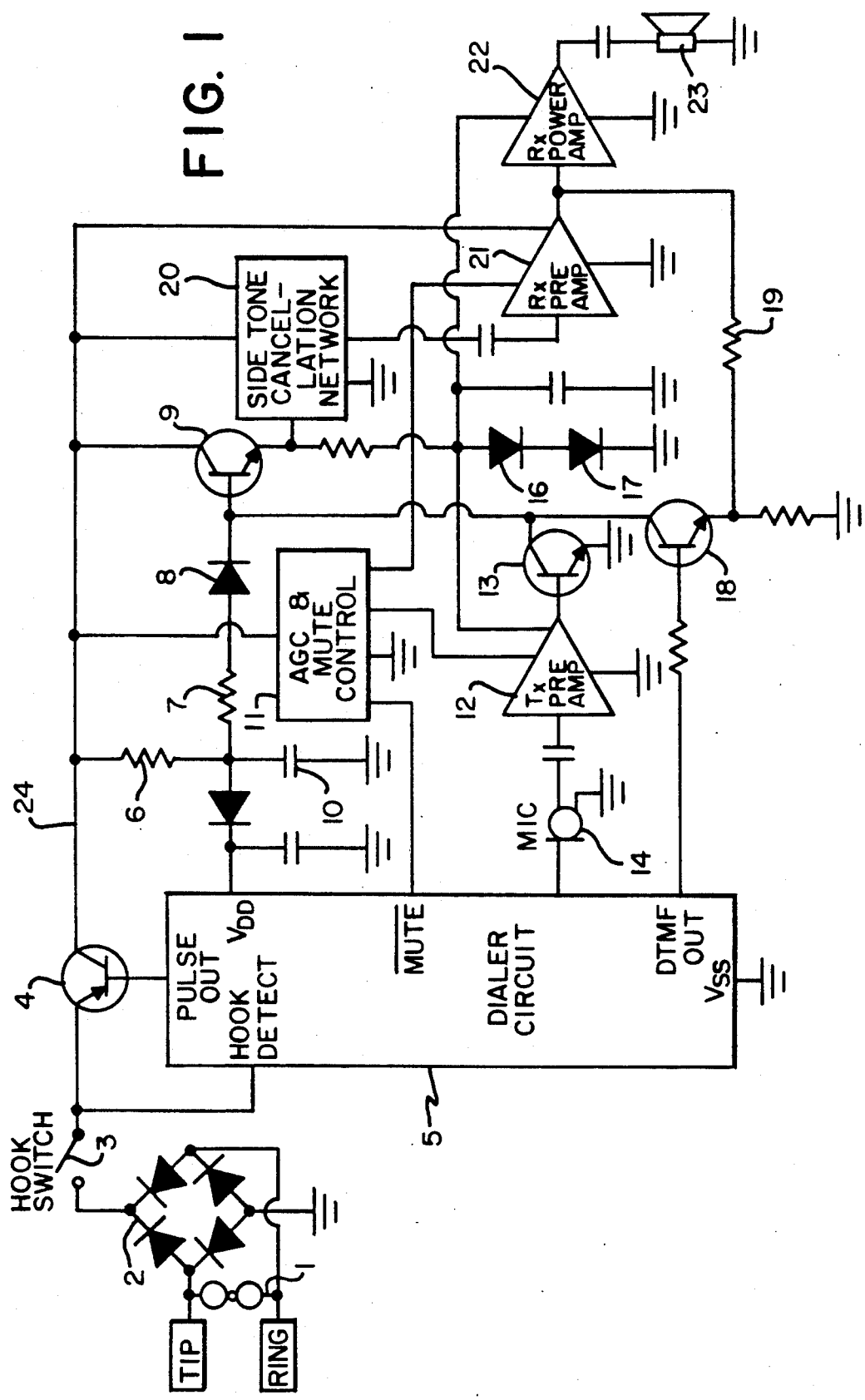
FIG. I

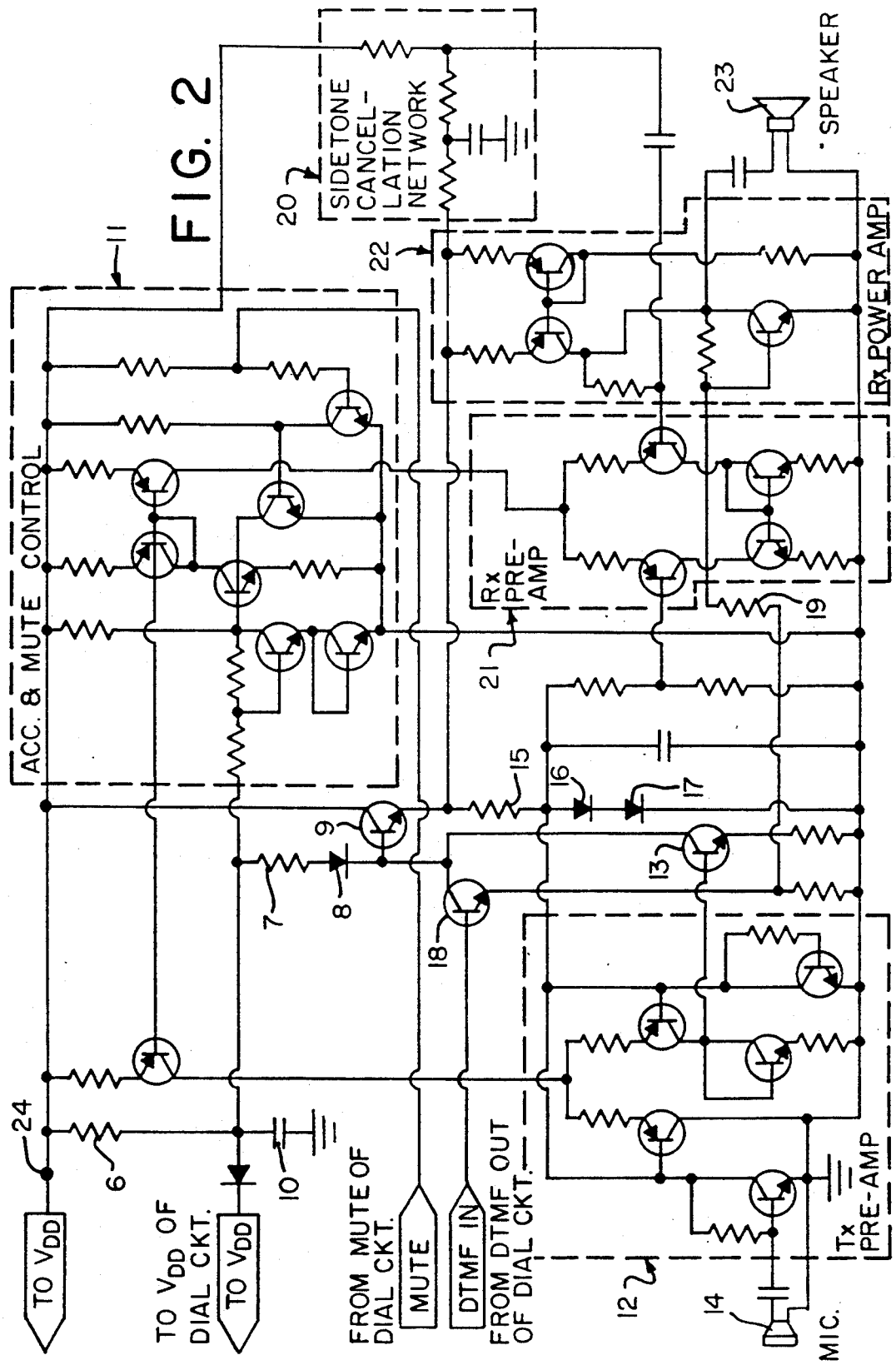

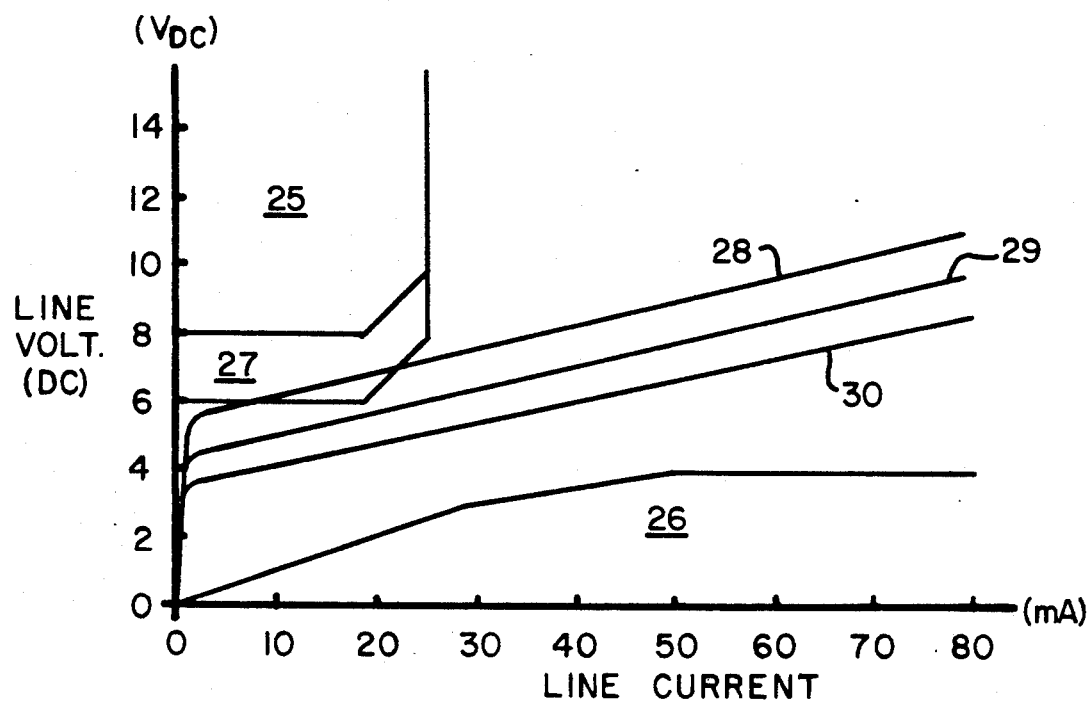
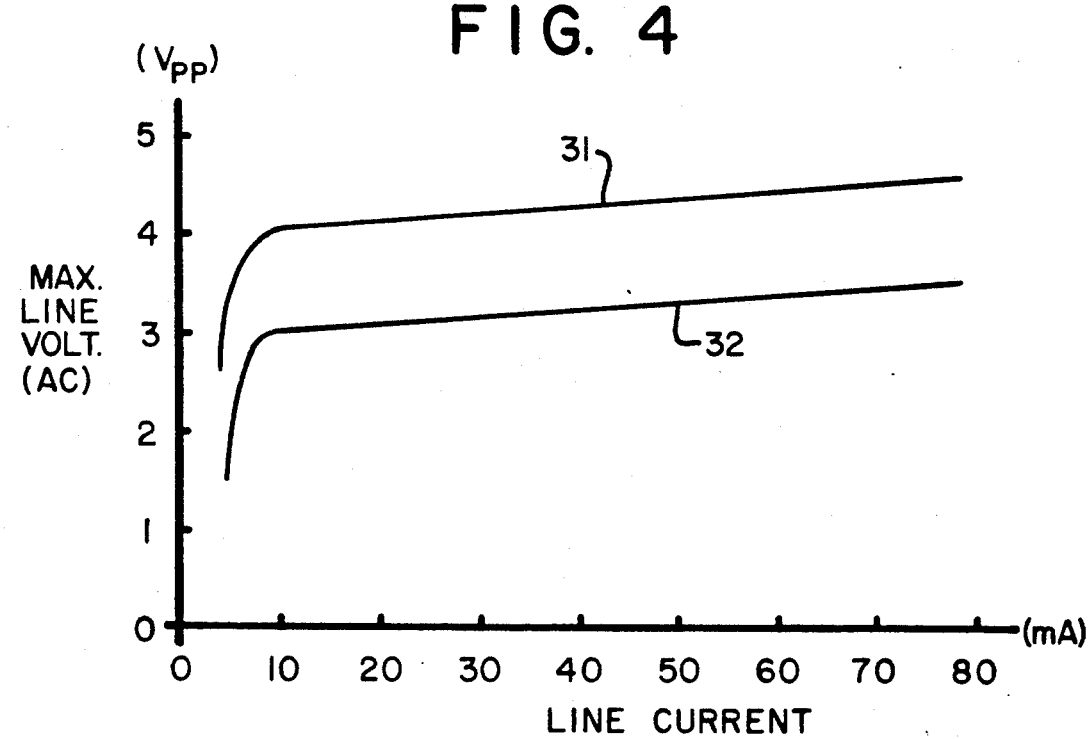

ELECTRICAL TELEPHONE SPEECH NETWORK

FIELD OF THE INVENTION

Present invention relates generally to telephone speech networks and, more particularly, concerns a telephone speech network in which a transmitting and a receiving amplifier are serially connected so as to receive the same bias current. A bias switching network is matched with the speech network so that line voltage drop of the network is increased or decreased in accordance with the operating mode of the network.

BACKGROUND OF THE INVENTION

Conventional electrical telephone speech networks are all of a parallel type, which means that the bias currents for the transmitting amplifier and the receiving amplifier are independent. Accordingly, the minimum working current for a parallel speech network is typically twice that of a serial type. The line current supplied to a speech network decreases as the speech network gets further from the exchange. Therefore, a parallel type speech network is more difficult to operate properly than a serial type at locations remote from the exchange, owing to lower line current. If the minimum working current of a speech network is higher, the number of extension telephones that can be connected to in parallel is decreased.

Besides, a mute circuit in a conventional electrical telephone speech network usually exhibits malfunction characteristics resulting from bias switching operation. For example, in pulse dialing mode, the mute circuit usually disables operation of a receiving amplifier and causes an increase in loop impedance so as to raise the line voltage drop of the whole network during "make" status. A pulse dialing telephone set utilizes a switch in conjunction with the speech network. By definition, "make" status occurs when the above-mentioned switch is on, a current flows through the telephone set, and the relay in an exchange is turned on. A mute circuit may cause malfunction of the relay in the exchange and it is difficult to meet the requirement of certain industrial standards, for example, EIA RS-470.

While in DTMF dialing mode, the conventional electrical telephone speech network utilizes a different DTMF transmitting amplifier, rather than the speech transmitting amplifier, to transmit signals. According to this conventional implementation, the DTMF transmitting amplifier needs extra working current for dialing so as to reduce the line voltage drop which, decreases the AC signal dynamic range. For this reason, the conventional type speech network cannot produce a larger DTMF signal and can easily cause distortion of signals, owing to the saturation of active devices.

Furthermore, a conventional electrical telephone speech network uses a sidetone cancellation network to acquire the DTMF sidetones. Additional distortion therefore results. Besides, the signal voltage level is very unstable. All the foregoing drawbacks cause the users to experience discomfort in hearing.

For example, FIG. 5 is a circuit block diagram of parallel type of speech network disclosed by M. Faheem Akram et al. in the IEEE Journal of Solid-State Circuits, Vol. SC-18, No. 6, December 1983. In this network, the bias currents of transmitting and a receiving amplifiers are designated $I_{TX}$ and $I_{RX}$ respectively and flow through different bias current routes. Further, this network structure acquires DTMF sidetones from a telephone line by a sidetone network.

The objectives of the present invention are to improve the above-mentioned disadvantages in conventional speech networks. This invention utilizes a serial type of circuit architecture to reduce the minimum working current. It also utilizes the auto bias switching method to maintain the most suitable line voltage drop, in order to meet the different requirements of the dialing modes and the talking states. At the same time, the direct coupling method is put into practice to decrease the distortion and control the volume stability of DTMF sidetones.

In accordance with the present invention, a serial type of electrical telephone speech network has power amplifiers of transmitting loop and receiving loop cascaded serially. Since the above-mentioned two power amplifiers utilize the same bias current, the minimum working current of the network is reduced. Further, with the uniquely designed bias switching circuit, in the pulse dialing mode, the line voltage drop of the whole network is automatically decreased during "make" status, that is, the loop impedance is reduced. As a consequence, the relay in the exchange can operate more reliably, so that the exchange can receive more accurate signals. In contrast, while in DTMF dialing mode, the bias switching circuit automatically increases the line voltage drop to provide the DTMF signal with a larger AC dynamic range, so as to decrease the distortion and enable a larger signal to be transmitted further. Furthermore, the directly coupled DTMF sidetone is the least distorted and the most stable in volume that telephone users can hear.

BRIEF DESCRIPTION OF THE DRAWING

In order that the invention may be more clearly understood, a preferred embodiment will now be disclosed in a greater detail with reference to the accompanying drawings wherein:

FIG. 1 is a block diagram of a telephone speech network in accordance with the present invention;

FIG. 2 is a circuit schematic diagram showing some of the circuit details in the block diagram of FIG. 1;

FIG. 3 is the DC line voltage vs. line current characteristics, obtained from data measured between the Tip and Ring terminals of the preferred embodiment of the present invention during the talking state, DTMF dialing mode and the "make" status in pulse dialing mode, respectively;

FIG. 4 is the characteristic of the maximum line voltage of AC dynamic range vs. line current, obtained from data measured "on line" (between the terminals of Tip and Ring) of the preferred embodiment of the present invention in talking state and in DTMF dialing mode, respectively.

Figure 5:
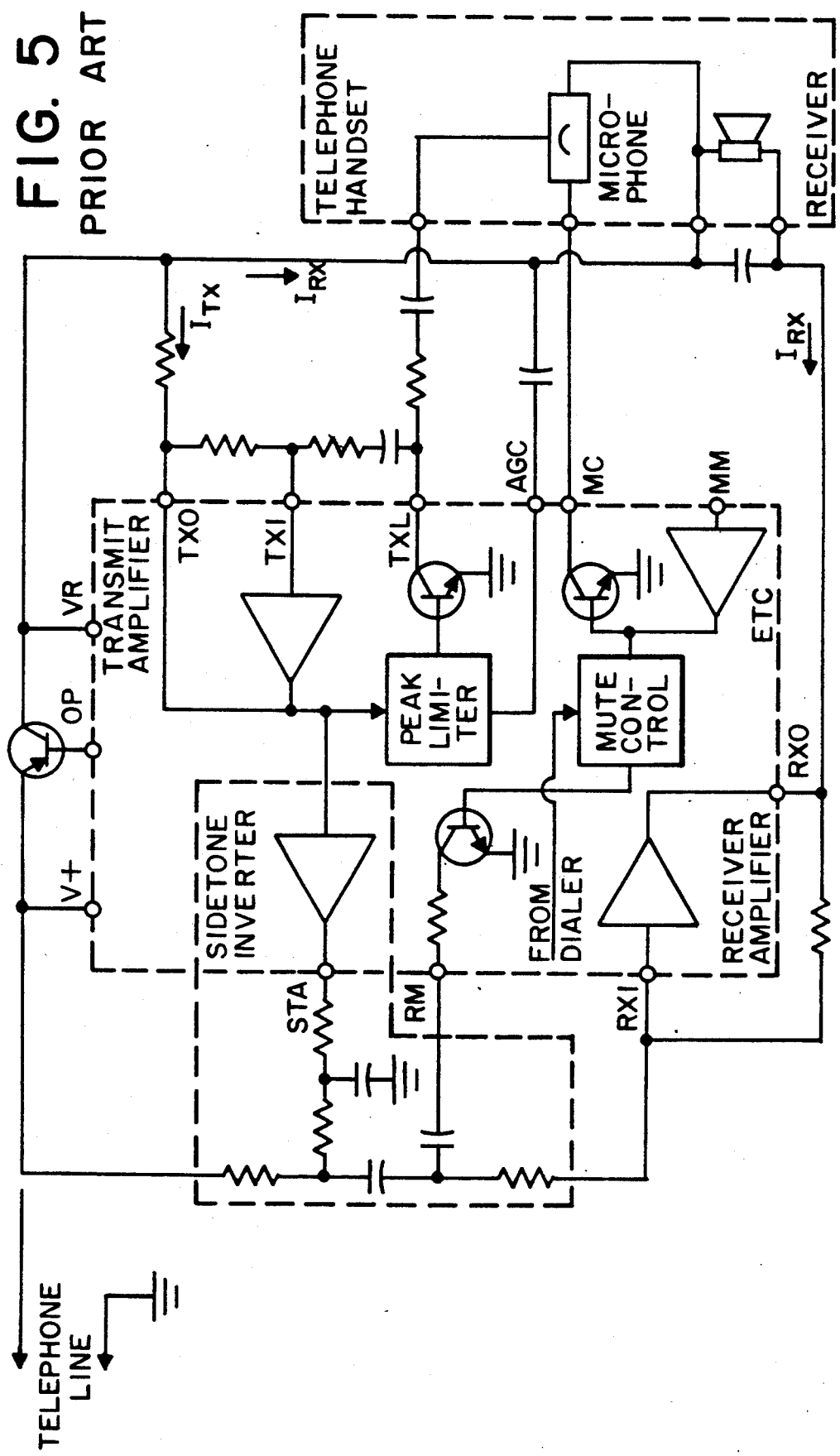
FIG. 5 is the prior art.

Table 1 is a summary of the reference characters used in the drawings.

TABLE I

Reference Numbers Used in the Drawing (1) Ringer
(2) Bridge rectifier
(3) Hook switch
(4) Pulse dialing switch transistor
(5) Dial signal generating circuit
(6)(7)(15)(19) Resistors (8)(16)(17) Diodes
(9)(13)(18) Transistors
(10) Filter capacitor
(11) Auto gain control and mute control circuit
(12) Transmitting preamplifier
(14) MIC
(20) Sidetone cancellation network
(21) Receiving preamplifier
(22) Receiving power amplifier
(23) Speaker
(24) Node corresponding to the point Vcc in FIG. 2.
(25)(26) The forbidden region of operation according to the U.S. Industrial Standard EIA RE-470.
(27) The permitted region of operation only in DTMF dialing mode according to EIA RE-470.
(28) The DC V-I characteristic measured at the Tip and Ring terminals in DTMF dialing mode.
(29) The DC V-I characteristic in the talking state.
(30) The DC V-I characteristic in pulse dialing mode.
(31) The dynamic range characteristic in DTMF dialing mode
(32) The dynamic range characteristic in the talking state.

DETAILED DESCRIPTION OF THE PREFERRED EMBODIMENT

Referring now to FIG. 1, a circuit block diagram illustrating a telephone speech network embodying the present invention is illustrated, wherein the components are designated by index numbers from 6 to 23.

In the bias loop, an NPN transistor 9 serves as a transmitting power amplifier and is serially cascaded with the receiving power amplifier 22. When the line current is low, most of the line current flows through the transmitting power amplifier and the receiving power amplifier. According to this implementation, the utilization rate of the line current is greatly improved, so this present invention can work properly under a much lower line current.

In the talking state, when the line current flow for the speech network increases, auto gain control and mute control circuit 11 reduces the gain of both the transmitting and receiving power of preamplifiers 12 and 21, thus stabilizing the transmitted and received volume. In addition, it turns off the transmitting preamplifier 12, the transmitting driving transistor 13 and the receiving preamplifier 21 in pulse and DTMF dialing modes in response to the low level $\overline{\text{MUTE}}$ signal.

Thus, the following two important consequences result in pulse dialing mode. First, because that the receiving preamplifier 21 has been turned off, and the output impedance becomes high, a user will not hear harsh "click" pulse dialing sounds from the speaker 23; the foregoing is a crucial function of a mute circuit. Secondly, because the transmitting driving transistor 13 has been turned off, the current flowing through resistors 6, 7 and diode 8 is decreased, and thus the voltage drop of this path is also decreased. Consequently, the voltage drop between the collector and emitter of the NPN transistor 9 of the transmitting power amplifier is reduced, so the line voltage drop in the "make" status is decreased. That is, the dc resistance of the whole speech loop is also reduced. Therefore, it makes the relay of the exchange function more accurately so that pulse dialing signals received by the exchange are more reliable. This is another advantage of the present invention.

In the DTMF dialing mode, the DTMF signal combining both DC and AC components from the dialer circuit 5 activates the DTMF buffer amplifier composed of the NPN transistor 18, which is off in talking state. Then, the DTMF signal is amplified by the transmitting power amplifier 9 and transmitted to a telephone line. There are two primary advantages in the foregoing implementation. First, when the DTMF buffer amplifier NPN transistor 18 is turned on, the current flowing through the resistors 6, 7, and the diode 8 increases so that the voltage drop of this circuit path is higher than that in talking state. Thus, the voltage drop between the collector and the emitter terminals of the transmitting power amplifier NPN transistor 9 increases, and the line voltage drop also rises. Since the voltage drop between the collector and the emitter terminals of the NPN transistor 9 is half the peak voltage value of the AC dynamic range of the speech circuit, the increase of the voltage drop results in the extension of the AC dynamic range so as to provide the swing range of a DTMF signal which in voltage level is larger than speech signals. Second, the receiving preamplifier 21 is turned off in dialing and its output becomes a high impedance, so the DTMF signal from the emitter terminal of the NPN transistor 18 can be directly fed into the input terminal of the receiving power amplifier 22 through a resistor 19. In this way, a low distorted DTMF sidetone with a stable signal voltage level is acquired.

FIG. 2 illustrates the detailed circuit structure of the preferred embodiment of FIG. 1. FIG. 3 and FIG. 4 are characteristics diagrams based on data measured from the preferred embodiment of this invention. These characteristics, demonstrate the excellent effects of the present invention.

What is claimed is:

1. An apparatus for acquiring DTMF sidetone signals in an electrical speech network, comprising:
    mute control circuit means responsive to a mute signal for setting said speech network into DTMF dialing mode;
    receiving preamplifier means connected to said mute control circuit means so as to be turned off thereby in a DTMF dialing mode, said receiving preamplifier having an output that becomes a high impedance in said DTMF dialing mode;
    DTMF buffer amplifier receiving DTMF signals including a DTMF sidetone; and
    a receiving power amplifier having a first terminal driven by said receiving preamplifier means and a second terminal driven by said DTMF buffer amplifier, said receiving power amplifier being responsive to the signals from both said receiving preamplifier means and said DTMF buffer amplifier to receive and amplify receiving signals while in a talking state and to acquire said DTMF sidetone from said DTMF buffer amplifier in said DTMF dialing mode.

2. An electrical telephone speech network comprising a transmitting power amplifier connected to a telephone line, a receiving amplifier, and means for connecting said transmitting power amplifier and said receiving amplifier in series cascade whereby said amplifiers utilize the same low line current as bias current from the telephone line.

* * * * *